United States Patent
Nakamura et al.

(10) Patent No.: US 7,821,888 B2
(45) Date of Patent: Oct. 26, 2010

(54) OPTICAL DISK REPRODUCING APPARATUS WITH A DISK IDENTIFYING FUNCTION

(75) Inventors: Yusuke Nakamura, Yokohama (JP); Masakazu Ikeda, Odawara (JP); Toshifumi Takeuchi, Yokohama (JP)

(73) Assignee: Hitachi, Ltd., Tokyo (JP)

(*) Notice: Subject to any disclaimer, the term of this patent is extended or adjusted under 35 U.S.C. 154(b) by 800 days.

(21) Appl. No.: 11/723,798

(22) Filed: Mar. 22, 2007

(65) Prior Publication Data
US 2007/0291616 A1 Dec. 20, 2007

(30) Foreign Application Priority Data
Jun. 15, 2006 (JP) .............................. 2006-165472

(51) Int. Cl.
*G11B 15/02* (2006.01)
(52) U.S. Cl. ............... 369/47.24; 369/47.19; 369/53.31
(58) Field of Classification Search ........................ None
See application file for complete search history.

(56) References Cited

U.S. PATENT DOCUMENTS 5,579,294 A * 11/1996 Ohta et al. ............... 369/47.31
6,483,787 B1 * 11/2002 Sugasawa et al. ......... 369/44.13
6,775,217 B1 * 8/2004 Kato et al. ................. 369/59.2
2002/0145962 A1 * 10/2002 Nishio et al. ............. 369/53.23
2005/0141385 A1 * 6/2005 Yamakawa et al. ....... 369/59.22
2007/0086284 A1 * 4/2007 Kawakami et al. ....... 369/30.27

FOREIGN PATENT DOCUMENTS

JP 5-101402 A 4/1993
JP 2004-213863 A 7/2004

* cited by examiner

*Primary Examiner*—Paul Huber
(74) *Attorney, Agent, or Firm*—McDermott Will & Emery LLP

(57) ABSTRACT

An optical disk reproducing apparatus has a circuit for detecting a difference in modulation scheme between two types of optical disks in a reproduction signal and a circuit for determining the modulation schemes of the disks on the basis of the difference. Thus the apparatus can reproduce the two optical disks with use of the circuit which determines the modulation schemes of the disks to be reproduced.

5 Claims, 9 Drawing Sheets

US 7,821,888 B2

OPTICAL DISK REPRODUCING APPARATUS WITH A DISK IDENTIFYING FUNCTION

INCORPORATION BY REFERENCE

The present application claims priority from Japanese application JP 2006-165472 filed on Jun. 15, 2006, the content of which is hereby incorporated by reference into this application.

BACKGROUND OF THE INVENTION

The present invention relates to an optical disk reproducing apparatus which reproduces data from an optical disk.

JP-A-2004-213863, when data is recorded on an optical disk by a run length limited (RLL) coding (1, 10), employs such a modulation scheme that "a minimum run length constraint is 1 and a maximum run length constraint is 10, and a frequency of repetition of the run length 1 in a channel bit string is limited to 5 or less" as described in Paragraph 0016, and attains an advantage that "the minimum run length constraint is 1 and the maximum run length constraint is 10, such a pattern that the run length 1 successively appears 6 times or more will not be present, and a channel bit string suitable for high density recording can be obtained" as described in Paragraph 0038.

JP-A-05-101402 discloses "such an optical disk identifying device that discriminates among the types of a plurality of optical disks by detecting light reflected from the optical disks and that comprises a first detection means for monitoring a quantity of laser light applied onto an optical disk 21 or 22 from a laser light source 60, a second detection means 72 for detecting a quantity of light applied onto the optical disk 21 or 22 and reflected thereby, and a calculation means 45 for finding a ratio between voltages detected by the first and second detection means 68 and 72; and that functions to discriminate among the optical disks by comparing the detection voltage ratio obtained by the calculation means 45 with previously-found voltage ratios in reflectivity between the plurality of types of different optical disks such as optical disks 21 and 22" as described in Paragraph 0011. And the optical disk identifying device can obtain an advantage that "the device can avoid the influences of the reflectivity caused by fluctuations of quantities of light emitted from the laser light source and can accurately discriminate among different disks, because the device is arranged to discriminate among the plurality of different optical disks by measuring a quantity of light emitted from the laser source and a quantity of light applied onto the optical disk 21 or 22 and reflected thereby, finding a ratio of the both light quantities converted to voltages, and comparing the found ratio with a reference value of the reflectivity determined by the plurality of different optical disks" as described in Paragraph 0012.

The optical disk identifying device disclosed in JP-A-05-101402 "discriminates among the plurality of different optical disks by measuring the quantity of light emitted from the laser source and the quantity of light applied onto the optical disk 21 or 22 and returned therefrom, finding the ratio of the both light quantities converted to voltages, and comparing the found ratio with the reference value of the reflectivity determined by the plurality of different optical disks". For this reason, the device can discriminate among different optical disks having different physical characteristics, but cannot discriminate among different types of optical disks having a common physical characteristic and thus cannot cope with reproduction control suitable for each of the optical disks, because the quantities of light returned therefrom become the same.

SUMMARY OF THE INVENTION

In accordance with the present invention, the aforementioned problem can be solved by providing an optical disk reproducing apparatus which can normally reproduce a plurality of types of optical disks having a common physical characteristic by discriminating among the optical disks based on differences between data structures or the like recorded in the disks having the common physical characteristic, and reproducing the disks according to the discriminated result.

The optical disk reproducing apparatus of the present invention can normally discriminate among even a plurality of types of optical disks having a common physical characteristic and can perform suitable reproduction control over the optical disks according to the types of the disks.

Other objects, features and advantages of the invention will become apparent from the following description of the embodiments of the invention taken in conjunction with the accompanying drawings.

DETAILED DESCRIPTION OF INVENTION

Embodiments of the present invention will be explained with reference to the accompanying drawings.

Figure 1:
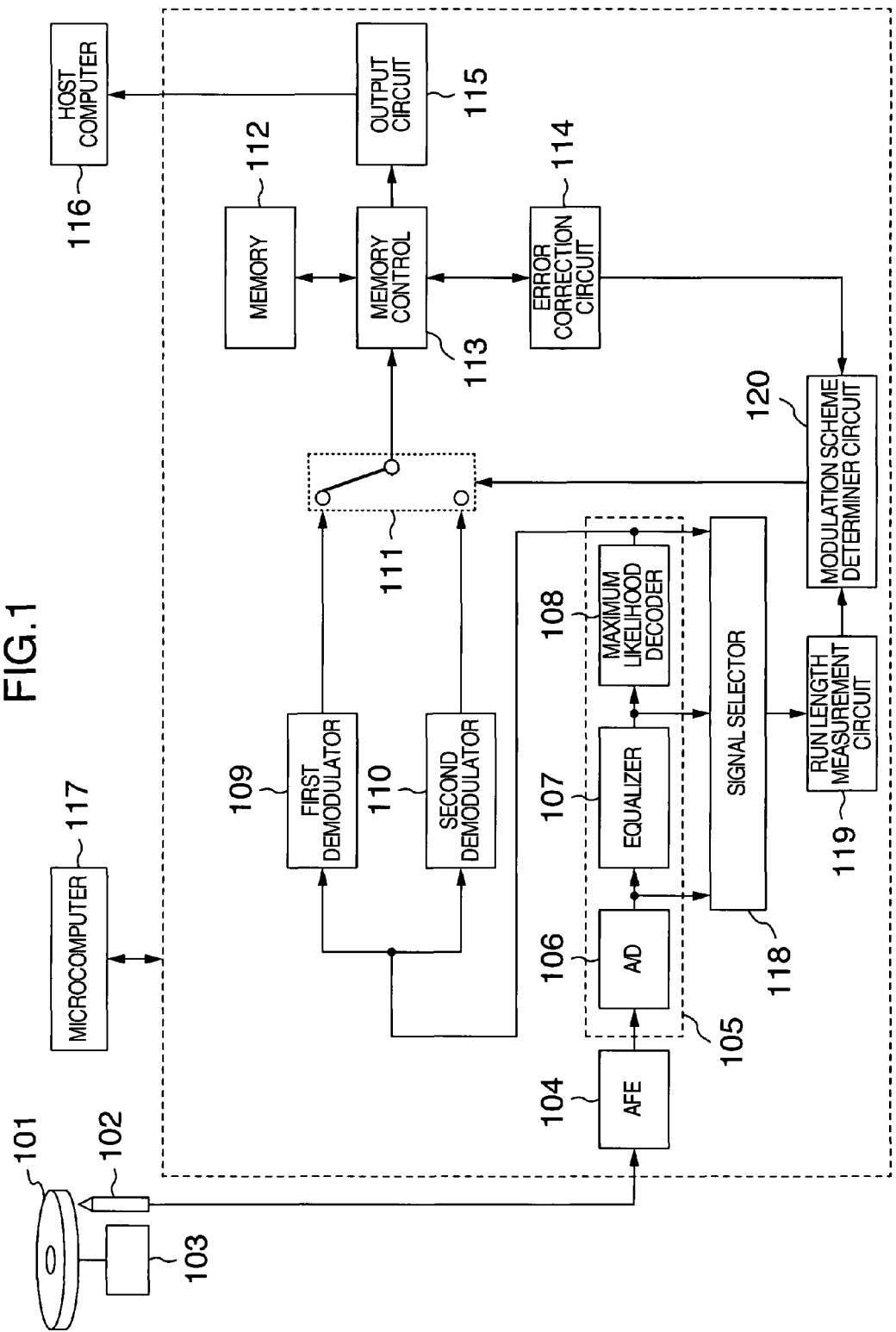
FIG. 1 shows a block diagram of an arrangement of an optical disk reproducing apparatus in accordance with a first embodiment of the present invention.

FIG. 1 shows an optical disk reproducing apparatus in accordance with a first embodiment of the present invention and a host computer provided outside of the optical disk reproducing apparatus. In the present embodiment, recording is carried out based on first and second modulation schemes, as modulation schemes of data signal processing, using the same RLL (Run Length Limited) coding but having different restricted iteration count of minimum run length (of e.g., 5 and 6). The present embodiment can cope with such a situation that there exist two types of optical disks having the same disk physical characteristics such as the reflectivity of a recording film, the track pitch of a recording track, and the thickness of a substrate.

The word "run length" used herein refers to a frequency of successive "0" or "1" in the bit string of data read out from a disk. The word "RLL (a, b) coding" refers to a modulation scheme having a minimum run length constraint limited to 'a' and a maximum run length constraint limited to 'b'.

Reference numeral 101 denotes an optical disk having data recorded thereon in a first modulation scheme (e.g., with a RLL (1, 10) coding having a frequency of repetition of a minimum run length constraint limited to 5) or in a second modulation scheme (e.g., with the RLL (1, 10) coding having a frequency of repetition of a minimum run length constraint limited to 6). Numeral 102 denotes a pickup for reproducing data on the optical disk 101, 103 denotes a spindle motor for rotating the optical disk 101, 104 denotes an analog front end (abbreviated to the AFE, hereinafter) 104 for performing analog processing on reproduction data read out from the optical disk 101. Numeral 105 denotes a binarizing circuit for converting an analog signal received from the AFE 104 into a binary digital signal. The binarizing circuit 105 incorporates an A-D converter 106 for converting the analog signal received from the AFE 104 into a digital signal, an equalizing circuit 107 for equalizing the received signal with respect to a desired characteristic, and a maximum likelihood decoder 108 for selecting a most likely code from a waveform. Numeral 118 denotes a signal selection circuit for selecting an output of the A-D converter 106 binarized by level slicing or the like, and output of the equalizing circuit 107 binarized by level slice or the like, and an output of the maximum likelihood decoder 108 binarized by the maximum likelihood decoder 108. That is, the signal selection circuit 118 selects one of the outputs suitable for the subsequent run length measurement according to the situation. Numeral 119 denotes a run length measurement circuit for measuring a run length as the pulse width of the signal selected by the signal selection circuit 118. Numeral 120 denotes a modulation scheme determination circuit for determining a modulation scheme based on the feature of the run length, and 109 denotes a first demodulation circuit for demodulating data according to a first modulation scheme. Numeral 110 denotes a second demodulation circuit for demodulating data according to a second modulation scheme. Numeral 111 denotes a changeover switch for switching between signals output from the first and second demodulation circuits 109 and 110, 112 denotes a memory for storing data therein, 113 denotes a memory control circuit for controlling an access to the memory 112, and 114 denotes an error correction circuit for performing error correction operation. Numeral 115 denotes an output circuit for descrambling the data and controlling the external output of the data, 116 denotes a host computer provided outside of the optical disk reproducing apparatus, and 117 denotes a microcomputer for performing integrated control on the system.

The above explanation has been made in connection with the RLL (a, b) coding method and the restricted repetition of the minimum run length. However, the present invention is not restricted to the above exemplary method and values.

Figure 8:
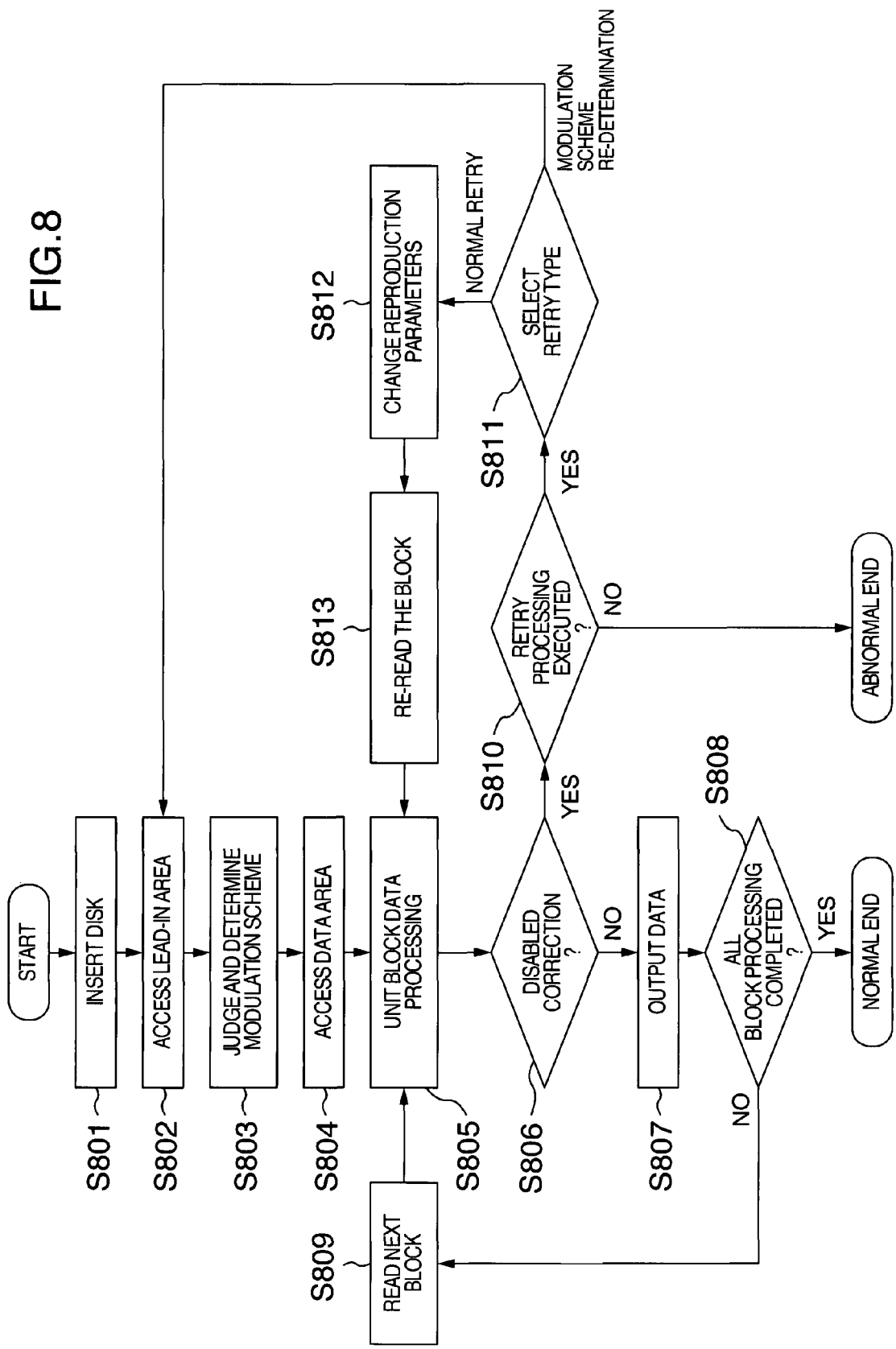
FIG. 8 is a flow chart showing a procedure of the operation of the optical disk reproducing apparatus of the invention.

Explanation will be made as to the reproducing operation of the optical disk reproducing apparatus according to the present embodiment, by referring to FIG. 8.

When the optical disk 101 is first inserted into the optical disk reproducing apparatus (step S801), the pickup 102 is ready for reading data on the optical disk and then the system accesses a lead-in area provided on the inner peripheral side of the optical disk 101 (step S802).

In a step (step S803) of modulation scheme judgement and determination, a signal read out from the optical disk 101 by the pickup 102 is analogically processed by the AFE 104 and then binarized by the binarizing circuit 105. Output data from the binarizing circuit 105 is applied to the first and second demodulation circuits 109 and 110. The first demodulation circuit 109 performs demodulating operation on the input according to the first modulation scheme, whereas the second demodulation circuit 110 performs demodulating operation on the input according to the second modulation scheme. Meanwhile, a binarized signal selected by the signal selection circuit 118 is applied to the run length measurement circuit 119, and a result of measurement of run length of the binarized signal by the run length measurement circuit 119 is applied to the modulation scheme determination circuit 120. Iteration count of minimum run length for the respective modulation schemes are previously recorded in the modulation scheme determination circuit 120. The run length measurement circuit 119 compares the iteration count of the minimum run length constraint measured by the run length measurement circuit 119 with the previously-recorded iteration count of the minimum run length, and determines on the basis of the comparison result that the optical disk is based on one of the modulation schemes. On the basis of the determined result, the changeover switch 111 is switched so that suitable demodulated data can be output.

In the data access to the lead-in area, a demodulation circuit is determined and the determined demodulation circuit starts reproducing data on a data area (step S804).

In the reproducing operation, demodulated data output from the changeover switch 111 is recorded in the memory 112 via the memory control circuit 113 on every unit block basis, and the data on the memory 112 is subjected to error correction by the error correction circuit 114 (step S805). The data when correctly corrected is descrambled by the output circuit 115 and then transmitted to the external host computer 116 (step S807).

When a plurality of blocks are processed, similar operation to the above is repeated until processing of all of desired blocks is completed (steps S808 and S809). When all the blocks to be reproduced are completed, the system terminates its reproducing operation.

When detecting a disabled error correction during the processing (step S805) of unit block data (step S806), the system determines whether or not to execute a retry to again process the block data (step S810). In the next retry type selection ((step S811), the system selects a normal retry, modifies reproduction parameters about the servo, PLL and equalizer (step S812), and thereafter the system again reads out data on blocks being now processed (step S813).

When the system fails to improve the disabled correction in the normal retry, the system selects re-determination of the modulation scheme in the retry type selection (step S811), and accesses the lead-in area (step S802). At this time, the system determines one of the modulation schemes different from the modulation scheme being now selected for the demodulation circuit (step S803), and the system causes the demodulation circuit to again execute reproduction of the data of the data area (steps S804 and S805).

When even such retry ends in the disabled correction, the system determines that the reproducing apparatus cannot read the optical disk because of a flaw or a defect on the disk or because of the unknown modulation scheme of the disk, and the system abnormally ends.

An example of making an access to the lead-in area has been given in the step S802. This is because the determination of the demodulation circuit prior to the data area conveniently eliminates the need for re-reading when the demodulation circuit is wrong, and because the lead-in area is read earlier than the data area. Further, since the lead-in signal is recorded in the optical disk in a form embossed thereon, it is considered that the signal has no jitter as shaking in the time-axis direction caused in the record mode and thus the judgement is less erroneously made. Therefore, when the demodulation circuit was wrong but re-reading ends in no problem or when the judgement is less erroneously made, the system may be arranged to access the data area or a lead-out area for judgement. In this connection, the reproducing operation of the optical disk can be similarly embodied not only in the present embodiment but also in the subsequent embodiments.

In the present embodiment, explanation has been made in connection with the case where recording is carried out according to the first and second modulation schemes with the same RLL coding but with different iteration count of minimum run length and where two types of optical disks having the same physical characteristic are present. Even when differences between the two types of optical disks are minimum and maximum run length constraints, however, the present invention can be similarly applied.

In this case, minimum and maximum run lengths corresponding to the respective modulation schemes are previously recorded in the modulation scheme determination circuit 120, so that the system detects minimum and maximum run lengths based on run lengths measured in the run length measurement circuit 119, compares them with the previously-recorded minimum and maximum run lengths, and determines the modulation scheme which is employed in the optical disk.

In the aforementioned method of determining the modulation scheme on the basis of the iteration count of the minimum run length or the minimum and maximum run lengths, the circuit scale of the system can be made small because the determination is made based on the run length measurement, and the operational speed of the system can be made faster because the determination circuit is provided at the preceding stage of the error correction circuit.

In the aforementioned embodiment, when optical disks having data recorded respectively in the first and second modulation schemes are used, and when a difference between the first and second modulation schemes is at least one of the iteration count of the minimum run length, the minimum run length, and the maximum run length; the optical disk reproducing apparatus can discriminate between the two types of optical disks having the same physical characteristic but having the different modulation schemes and can normally reproduce the respective optical disks, by determining the modulation schemes by the modulation scheme determination circuit 120.

Figure 9:
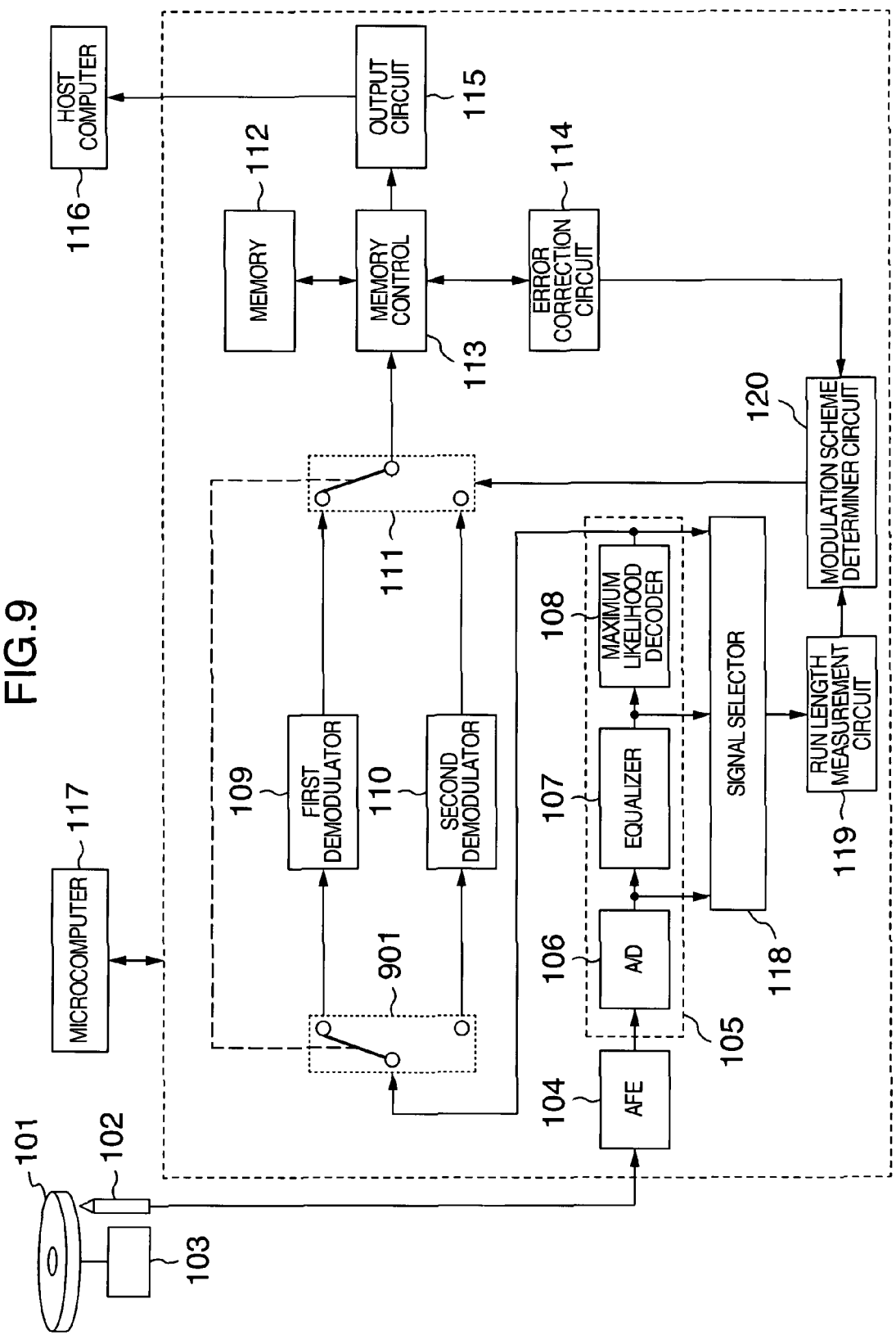
FIG. 9 is a block diagram of an arrangement of an optical disk reproducing apparatus in accordance with a variation of the first embodiment of the invention.

FIG. 9 shows a method for judging and determining the modulation schemes of optical disks in an optical disk reproducing apparatus as a variation of the first embodiment. The variation is intended to suppress the power consumption of the demodulation circuit by stopping the demodulation circuit not to be selected. The present variation is different from the optical disk reproducing apparatus of the first embodiment shown in FIG. 1 in that a changeover switch 901 is newly added. The changeover switch 901 is operated in cooperation with the changeover switch 111. Constituent elements having the same reference numerals as those in FIG. 1 have the same or equivalent functions, and thus explanation thereof is omitted.

In the optical disk reproducing apparatus of FIG. 9, the changeover switch 901 is provided even at the preceding stage of the first and second demodulation circuits 109 and 110. The changeover switch 901 is operated cooperatively so as to select the same demodulation circuit as the changeover switch 111 selects. When one of the demodulation circuits is selected through the above operation, no signal is input to the other demodulation circuit not selected, and the other demodulation circuit is stopped, thus suppressing the power consumption of the circuit.

The method of suppressing the power consumption explained in FIG. 9 is not limited to the application to the optical disk reproducing apparatus of the first embodiment, but may be applied even to the subsequent embodiments.

Figure 2:
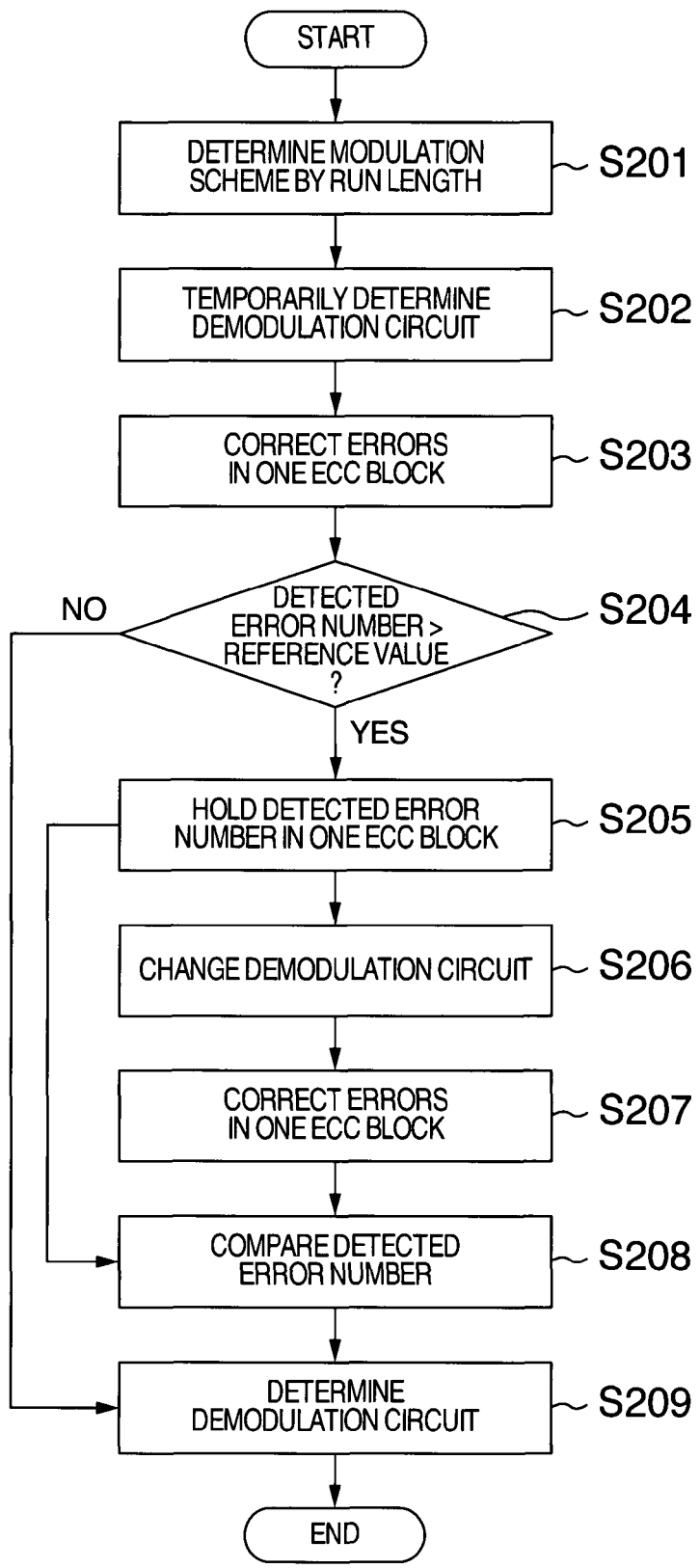
FIG. 2 is a flow chart showing a processing procedure of another variation of the first embodiment of the present invention.

FIG. 2 shows a method for judging and determining modulation schemes in an optical disk reproducing apparatus in accordance with another variation of the first embodiment. This variation corresponds to another example of determining the modulation schemes with use of an error detection result to increase the reliability of the determination result in the modulation scheme judgement and determination (step S803) of FIG. 8.

First of all, the modulation scheme determination circuit 120 determines the modulation scheme based on a run length (step S201), and the changeover switch 111 temporarily determines the output of the demodulation circuit on the basis of the determination result of the modulation scheme determination circuit 120 (step S202). The temporary determination may be erroneous due to the erroneous detection of the run length or the like and the wrong demodulation circuit may be selected.

If a reproduction signal is demodulated by the wrong demodulation circuit, the demodulation is carried out in the wrong modulation scheme different from the modulation scheme at the time of its modulation. For this reason, an increased number of errors are detected in the demodulated data. In other words, the number of errors detected in the data can be used as a reference to determine whether the selection of the modulation scheme is right or not.

Since the number of errors detected in the demodulated data indicates such a characteristic, the reliability of the result by the other determination method can be increased with use of an error correction result as shown in steps S203 to S209. More specifically, the error correction circuit 114 performs error correcting operation on part of the output of the demodulation circuit 109 or 110 determined in the step S202 corresponding to one ECC (Error Correction Code) block as a reference unit of error correction (step S203), the error correction circuit 114 outputs a detected error number obtained in the course of the error correction to the modulation scheme determination circuit 120, the modulation scheme determination circuit 120 compares the received detected error number with a reference value as a preset error number (step S204), and if the detected error number is smaller than the reference value, the circuit 120 determines that the determination by the run length is correct (step S209).

If the detected error number is not smaller than the reference value, on the other hand, then the system also finds an error number detected in the output of the other demodulation circuit, compares it with the detected error numbers when both the demodulation circuits are used, and determines that the optical disk uses one of the modulation schemes. More specifically, the detected error number when the demodulation circuit temporarily determined in the step S203 is used is previously stored in the modulation scheme determination circuit 120 (step S205), and the changeover switch 111 is switched to the other position (step S206). Under this condition, the error correction circuit 114 performs error correcting operation on data corresponding to one ECC block (step S207), the modulation scheme determination circuit 120 compares the detected error number obtained when the other demodulation circuit is used with the detected error number stored in the step S205 (step S208), and determines the demodulation circuit having the relatively-small detected error number as the demodulation circuit to be used for the reproducing operation (step S209).

In this variation, the amount of data for measurement of the detected error number is set at one ECC block. However, the data amount is not limited to the one ECC block, but may be suitably modified and applied. Further, the protection of the determination result explained in FIG. 2 is not limited to the application to the optical disk reproducing apparatus of the first embodiment, but may be applied even to the subsequent embodiments. In addition, the determination based on the error correction result in the present embodiment can be used not only to increase the reliability of the determination result by the other determination method but also to be independently used.

When the error correction result is used, not only the effects of the optical disk reproducing apparatus of the first embodiment can be obtained, but also the determination result base on the run length can be protected and the reliability of the determined result can be increased.

Figure 3:
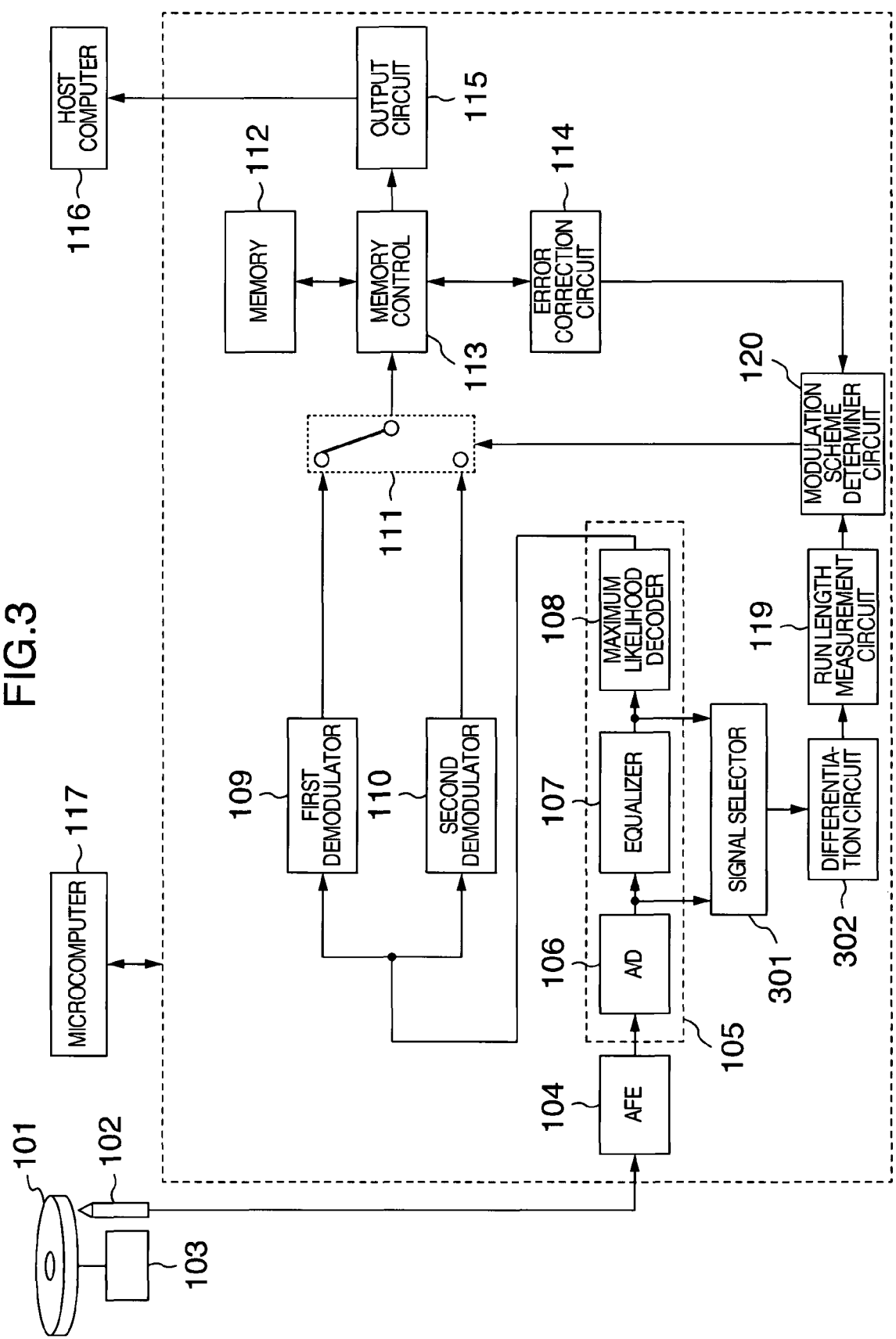
FIG. 3 is a block diagram of an arrangement of an optical disk reproducing apparatus in accordance with a second embodiment of the present invention.

FIG. 3 shows an arrangement of an optical disk reproducing apparatus in accordance with a second embodiment of the present invention. In the present embodiment, upon measurement of a run length, a differentiating circuit is inserted to suppress error detection. The present embodiment is different from the first embodiment of the optical disk reproducing apparatus of FIG. 1 in a signal selection circuit 301 and a differentiating circuit 302. The signal selection circuit 301 selects outputs from the A/D converter 106 and equalizing circuit 107, whereas, the differentiating circuit 302 differentiates and binarizes a waveform and then outputs the binarized result. Constituent elements having the same reference numerals as those in FIG. 1 have the same or equivalent functions, so explanation thereof is omitted.

In the optical disk reproducing apparatus of FIG. 3, the signal selection circuit 301 selects the output signals of the A/D converter 106 and equalizing circuit 107 and outputs the selected signal. The signal selection circuit 301 can select the output suitable for the subsequent run length measurement according to the situation. The differentiating circuit 302 differentiates the output selected by the signal selection circuit 301 into a binarized signal and applies the signal to the run length measurement circuit 119.

Explanation will now be made as to the effects of the differentiating circuit 302. Shown in FIG. 4 are a mark 401 recorded in an optical disk, an output waveform 402 of the AFE 104 upon reproduction of the recording mark, a binary signal 403 obtained by slicing the output waveform 402 with a zero level, a waveform 404 obtained by inverting the output waveform 402 and second order differential, and a binary signal 405 obtained by slicing the waveform 404 with a zero level.

Figure 4:
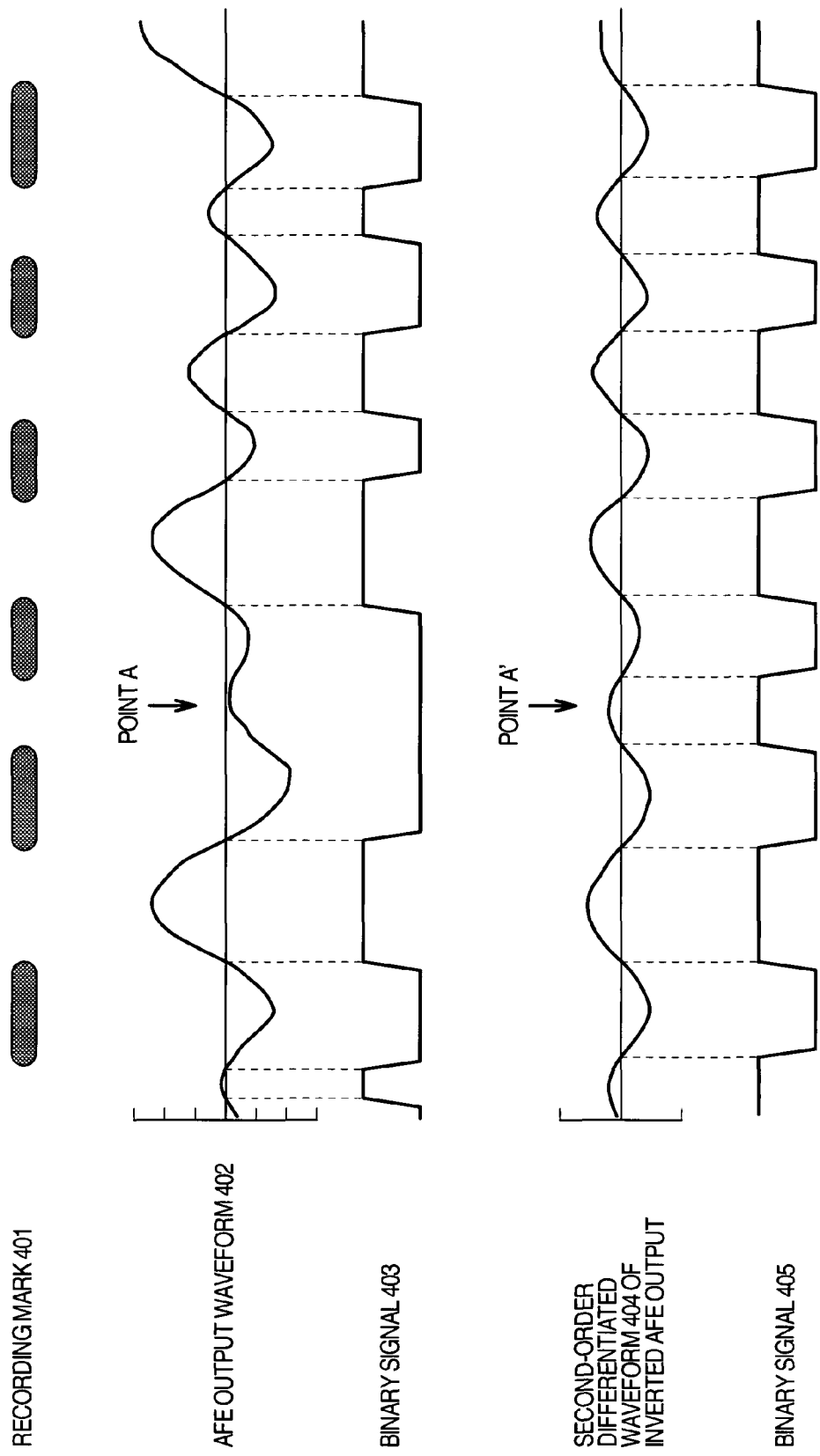
FIG. 4 shows an example of waveforms of signals appearing when the second embodiment of the present invention is used.

As shown in FIG. 4, in the output waveform 402 of the AFE 104, a short run length signal (e.g., at a point A) has a small amplitude and does not cross a zero level. For this reason, the run length is erroneously detected. In the differentiated waveform 404, however, the run length of the original signal can be calculated by extracting a change point in the waveform, even if the signal does not cross the zero level, for example. Thus, erroneous detection (e.g., at a point A') can be prevented, and a jitter (a shake of the reproduced digital signal in the time-axis direction) caused by slicing the small-amplitude signal with the zero level can also be reduced. Further, the use of the differentiated waveform provides advantageous effect even for fluctuations in a D.C. component.

When the differentiated signal is used in the judgement of the modulation scheme in this way, not only the effects of the first embodiment can be obtained, but also the erroneous detection of the run length can be suppressed as shown in FIG. 4 and the modulation scheme can be determined more reliably than the modulation scheme determination method of the first embodiment.

Figure 5:
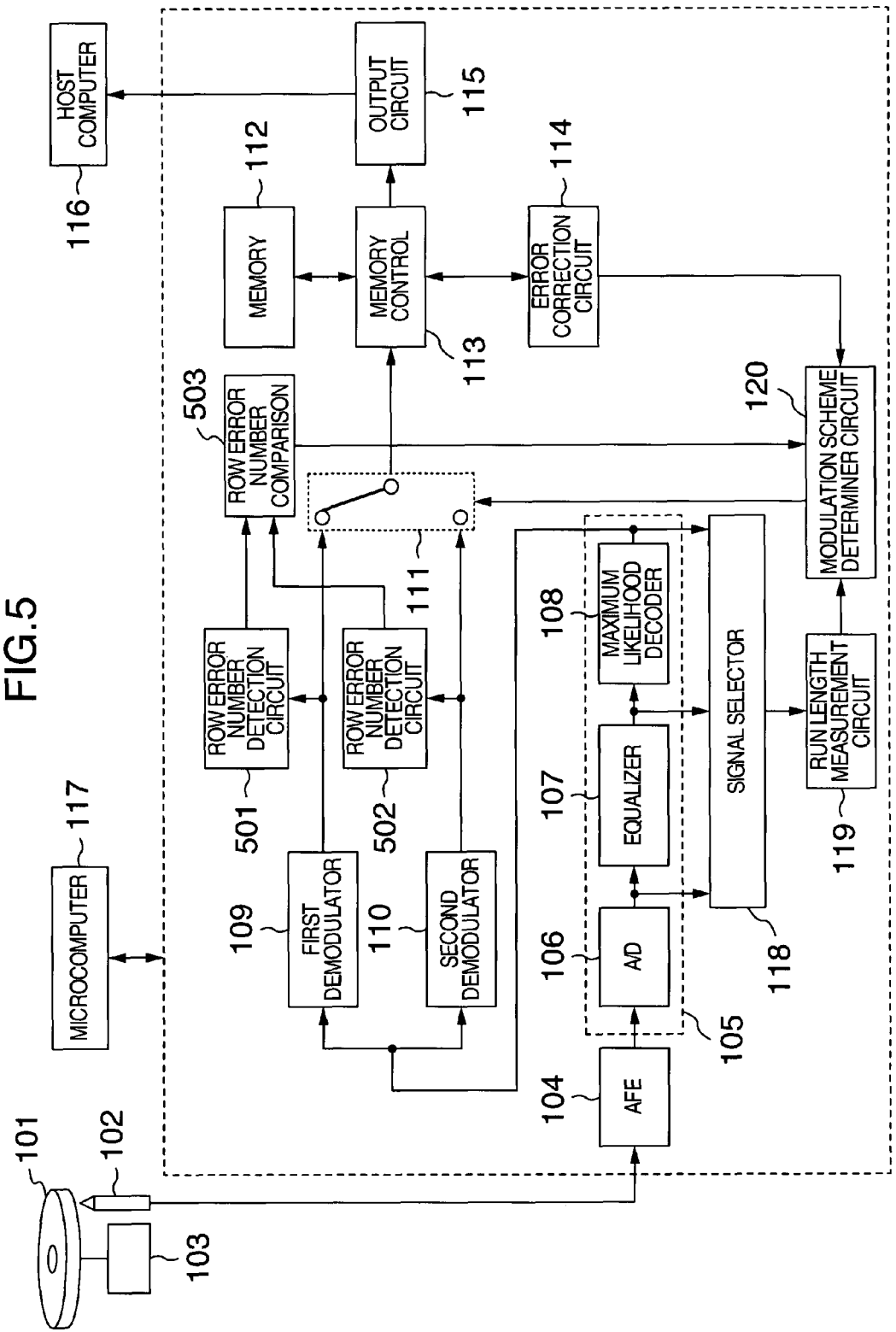
FIG. 5 is a block diagram of an arrangement of an optical disk reproducing apparatus in accordance with a third embodiment of the present invention.

FIG. 5 shows an arrangement of an optical disk reproducing apparatus in accordance with a third embodiment of the present invention. The present embodiment determines the modulation schemes of optical disks recorded in first and second modulation schemes with use of row error number detection circuits 501 and 502 and a row error number comparison circuit 503. The present embodiment is different from the first embodiment of the optical disk reproducing apparatus of FIG. 1 in the row error number detection circuits 501 and 502 and the row error number comparison circuit 503. The row error number detection circuits 501 and 502 each measure the number of errors in a row direction in ECC unit block data obtained from the demodulation result. The row error number comparison circuit 503 determines the modulation scheme on the basis of the measured row error number. Constituent elements having the same reference numerals as those in FIG. 1 have the same or equivalent functions, and thus explanation thereof is omitted.

The word "row error" as used therein refers to an error number detected when error detection corresponding to one row is carried out in the ECC block.

In the optical disk reproducing apparatus of FIG. 5, the row error number detection circuit 501 measures a row error number on the basis of a result demodulated by the first demodulation circuit 109, and the row error number detection circuit 502 measures a row error number on the basis of a result demodulated by the second demodulation circuit 110. The row error number comparison circuit 503 compares the error numbers measured by the row error number detection circuits 501 and 502, and the modulation scheme determination circuit 120 determines the modulation scheme by selecting the demodulation circuit having the smaller row error number.

Explanation will be made in detail as to the row error number detection circuits 501 and 502 and the row error number comparison circuit 503. When the reproduction signal is demodulated according to a demodulation table of the wrong modulation scheme, an increased number of errors are present in the demodulated data because of no correlation with the encoding table upon the modulation. The number of such errors can be obtained by the row error number detection circuits 501 and 502 which performs error correcting operation on the ECC block in the row direction with use of the error correction code in the row direction and detects an error correction location. Thus, row error numbers can be acquired from the demodulated data of the demodulation circuits 109, 110, the modulation scheme determination circuit 120 can determine the modulation scheme of the optical disk on the basis of the result compared by the row error number comparison circuit 503, and can select the suitable demodulation circuit therefor.

Since the error numbers in the data demodulated by the two demodulation circuits are measured and compared in the present embodiment, the modulation scheme can be reliably determined. Further, since the operation of the demodulation circuit is carried out in the row direction, the need for holding data especially in a memory can be eliminated and the determination can be made faster than the method using the result of the error correction circuit 114 explained in the variation of the first embodiment. Since the result of the error correction circuit 114 is used in the variation of the first embodiment, it is required to perform changeover between the first and second demodulation circuits with time. In the present embodiment, however, the row error numbers can be simultaneously calculated by the row error number detection circuits 501 and 502.

In addition, the present embodiment may be combined with the run length determination method explained in the first embodiment. It goes without saying that the combination is not limited to the above run length determination method but may be made with another method to be explained later. Although explanation has been made as to the measurement of the row-direction errors in the present embodiment, the measurement may be made for errors in a column direction. When the reproduction data is previously known, the embodiment may be similarly implemented by comparing a reproduced bit string with the reproduction data as an expected value.

The optical disk reproducing apparatus of the present embodiment not only can attain the effects of the optical disk reproducing apparatus of the first embodiment, but also can determine the modulation schemes with use of the row error numbers and can more reliably determine the modulation schemes by combining with the determination method explained in the first embodiment.

Figure 6:
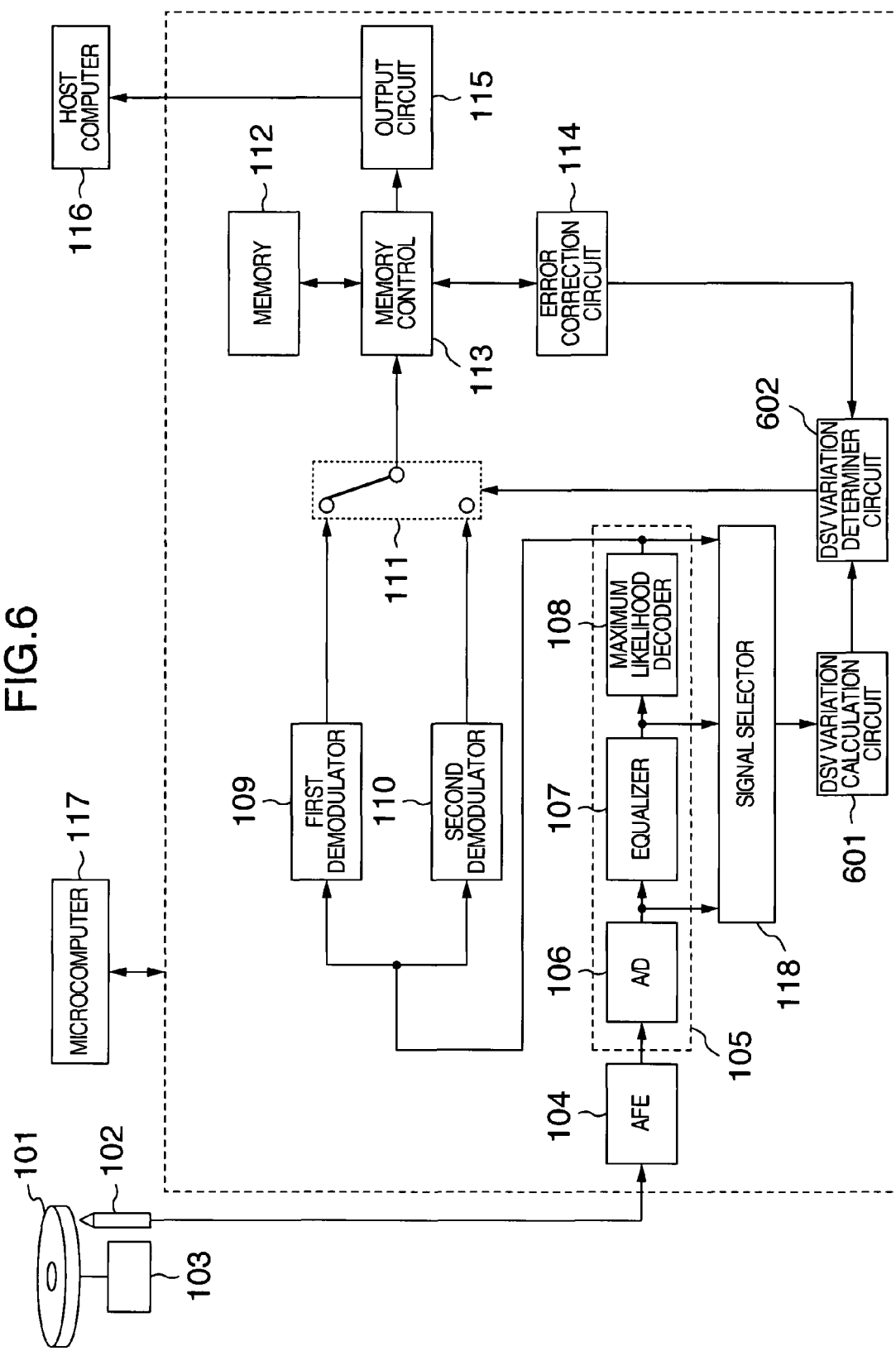
FIG. 6 is a block diagram of an arrangement of an optical disk reproducing apparatus in accordance with a fourth embodiment of the present invention.

FIG. 6 shows an arrangement of an optical disk reproducing apparatus in accordance with a fourth embodiment of the present invention. The present embodiment can cope with a case where two types of optical disks are present which are different in at least one of a DSV (Digital Sum Value) variation and a variation cycle in a reproduction signal caused by different DSV control capabilities of the disks and which have the same physical characteristic. A difference between the optical disk reproducing apparatuses FIGS. 1 and 6 lies in a DSV variation calculation circuit 601 and a DSV variation determination circuit 602. The DSV variation calculation circuit 601 calculates a DSV variation, and the DSV variation determination circuit 602 determines the modulation scheme. Constituent elements having the same reference numerals as those in FIG. 1 have the same or equivalent functions, and explanation thereof is omitted.

Explanation will now be made as to DSV. A DSV is a cumulative value when "1" and "0" in a bit string are regarded as "+1" and "−1" respectively. The smaller the absolute value of the DSV is the more the string contains "0", the DSV contains less D.C. component and less low-frequency component. The DSV is used so that the D.C. and low-frequency components become less.

In the optical disk reproducing apparatus of FIG. 6, a signal selected by the signal selection circuit 118 is applied to the DSV variation calculation circuit 601 to measure a DSV and calculate a variation. Reference values for DSV variations for the two types of optical disks are previously set in the DSV variation determination circuit 602, and the DSV variation determination circuit 602 compares the calculated DSV variation with the reference values and determines the modulation schemes of the optical disks on the basis of the comparison result.

A difference between the DSV variations or the variation cycles takes place when the disks have different DSV control capabilities due to different encoding tables or modulation rules in the modulation scheme of the data signal processing system. Thus, the modulation schemes of the optical disks can be determined by previously setting reference values of the two types of optical disks as DSV variations in the DSV variation determination circuit 602 and comparing the calculated DSV variation with the reference values. In the present embodiment, the variation has been used as an example. However, the modulation schemes of the two types of optical disks can be determined even by providing a DSV variation cycle calculation circuit and a DSV variation cycle determination circuit in place of the DSV variation calculation circuit 601 and the DSV variation determination circuit 602, previously setting reference values of DSV variation cycles for the two optical disks in the DSV variation cycle determination circuit, and comparing the measured results of the DSV variation cycles with the reference values.

In the present embodiment, when a difference between the first and second modulation schemes causes at least one of the DSV variation and the variation cycle to appear in the optical disks recorded in the first and second modulation schemes respectively, there is obtained an optical disk reproducing apparatus which can reproduce the two types of optical disks having the same physical characteristic but having the different modulation schemes, by determining the modulation schemes with use of the DSV variation calculation circuit 601 and the DSV variation determination circuit 602.

Figure 7:
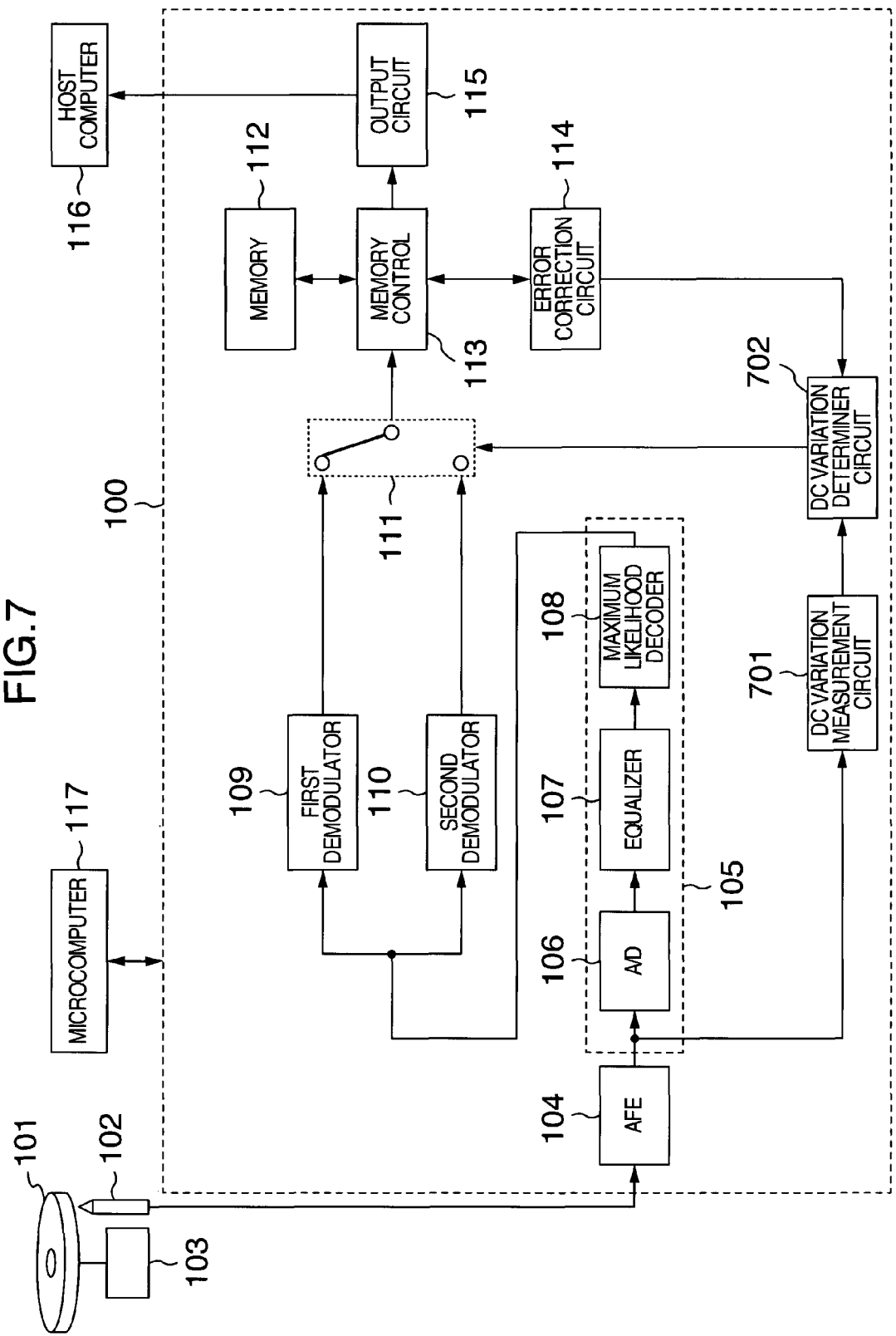
FIG. 7 is a block diagram of an arrangement of an optical disk reproducing apparatus in accordance with a fifth embodiment of the present invention.

FIG. 7 shows an arrangement of an optical disk reproducing apparatus in accordance with a fifth embodiment of the present invention. The present embodiment can cope with a case where two types of optical disks are present which are different in at least one of a variation and a variation cycle of a low-frequency component in a reproduction signal and are recorded in first and second modulation schemes respectively and which has the same physical characteristic. FIG. 7 is different from FIG. 1 of the optical disk reproducing apparatus of the first embodiment in at a DC (Direct Current) variation measurement circuit 701 and a DC variation determination circuit 702. The DC variation measurement circuit 701 is used to measure a variation in the low-frequency component, and the DC variation determination circuit 702 is used to determine the modulation schemes. Constituent elements having the same reference numerals as those in FIG. 1 have the same or equivalent functions, and explanation thereof is omitted.

The word "DC" as used herein refers to a direct current component or a low-frequency component in a reproduction signal.

In the optical disk reproducing apparatus of FIG. 7, an analog output of the AFE 104 is input to the DC variation measurement circuit 701, which in turn measures a low-frequency component and calculates a variation. The DC variation determination circuit 702 compares the calculated low-frequency component variation with reference values of DC variations for the two types of optical disks previously set in the DC variation determination circuit 702, and determines the modulation schemes of the optical disks on the basis of the comparison result.

A difference between the variations or variation cycles of the low-frequency component for the optical disks takes place when the disks have different low-frequency component suppressing capabilities due to different encoding tables or modulation rules in the modulation scheme of the data signal processing system. Thus the modulation schemes can be determined by previously setting reference values of DC variations in the two types of optical disks as variations of low-frequency component in the DC variation determination circuit 702 respectively and comparing the calculated low-frequency component variations with the reference values. In the present embodiment, explanation has been made as to the variation as an example. However, the modulation schemes of the two types of optical disks can be determined even by providing a DC variation cycle calculation circuit and a DC variation cycle determination circuit in place of the DC variation measurement circuit 701 and the DC variation determination circuit 702, previously setting reference values of the DC variation cycles for the two types of optical disks in the DC variation cycle determination circuit, and comparing the measured DC variation cycle results with the reference values.

In the present embodiment, when a difference between the first and second modulation schemes of the optical disks recorded in the first and second modulation schemes causes at least one of the low-frequency component variation and the variation cycle thereof to appear, there is obtained an optical disk reproducing apparatus which can reproduce the two types of optical disks having the same physical characteristic but having the different modulation schemes, by determining the modulation schemes with use of the DC variation measurement circuit 701 and the DC variation determination circuit 702.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk reproducing apparatus for reproducing data from an optical disk, the optical disk reproducing apparatus comprising:
   a pickup for irradiating the optical disk with a laser beam;
   an analog front end for converting light reflected by the optical disk into an electric signal;
   a binary circuit for converting the electric signal as an output of the analog front end into a binary signal;
   a first demodulation circuit for demodulating the binary signal as an output of the binary circuit according to a first modulation scheme having a first predetermined limited iteration count of a minimum run length;
   a second demodulation circuit for demodulating the binary signal as the output of the binary circuit according to a second modulation scheme having the same minimum run length as the first modulation scheme and having a second predetermined limited iteration count of the minimum run length, wherein the first limited iteration count is different from the second limited iteration count;
   a run length measurement circuit for measuring an iteration count of the minimum run length of the binary signal;
   a switch for selectively outputting outputs of the first and second demodulation circuits; and
   a modulation scheme determination circuit for determining which modulation scheme is used for the optical disk, according to the measured iteration count of the minimum run length, and said first and second limited iteration counts, controlling the switch so as to selectively output the output of the first demodulation circuit when data from an optical disk of the first modulation scheme is reproduced, and controlling the switch so as to selectively output the output of the second demodulation circuit when data from an optical disk of the second modulation scheme is reproduced.

2. An optical disk reproducing apparatus according to claim 1, further comprising a differentiation circuit for differentiating the binary signal as the output of the binary circuit, and wherein the modulation scheme determination circuit controls the switch on the basis of an output of the differentiation circuit.

3. An optical disk reproducing apparatus according to claim 1, further comprising a DSV variation calculation circuit for calculating a variation in a digital sum value (DSV) of the binary signal as the output of the binary circuit, and wherein the modulation scheme determination circuit controls the switch on the basis of an output of the DSV variation calculation circuit.

4. An optical disk reproducing apparatus according to claim 1, further comprising a DC variation calculation circuit for calculating a variation in a low-frequency component (DC) in the binary signal as the output of the binary circuit, and wherein the modulation scheme determination circuit controls the switch on the basis of an output of the DC variation calculation circuit.

5. An optical disk reproducing apparatus according to claim 1, wherein the limited value m of a frequency of repetition of the minimum run length in the first modulation scheme is 5, and the limited value n of a frequency of repetition of the minimum run length in the first modulation scheme is 6.

* * * * *